March 12, 1963  E. BROWN  3,080,896
PUSHCART-TYPE TREE AND BRUSH CUTTING MACHINE
Filed Sept. 15, 1960
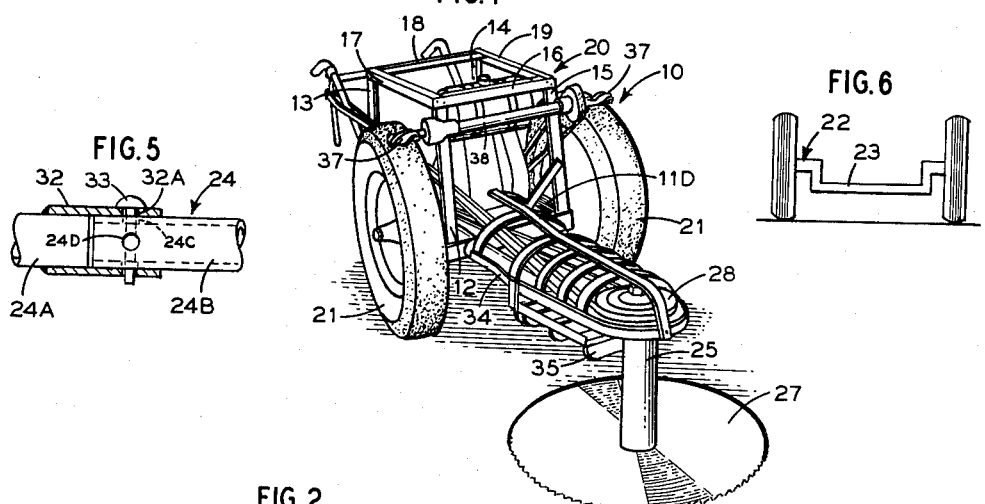
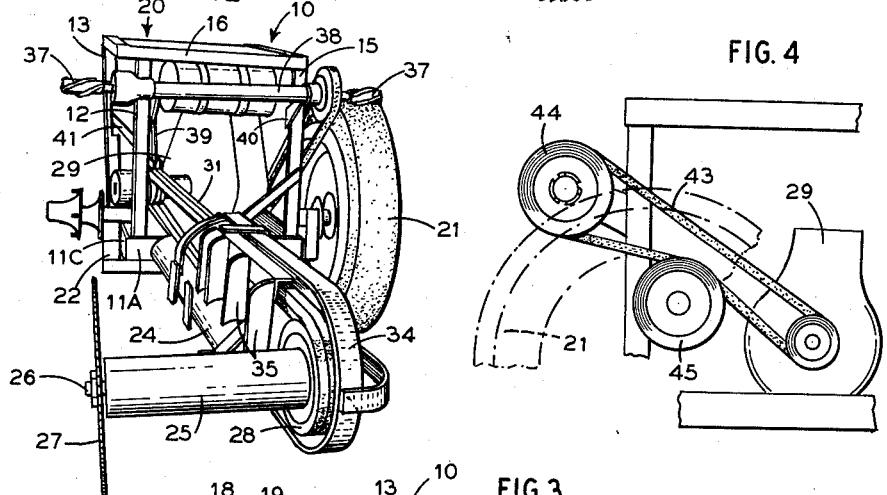
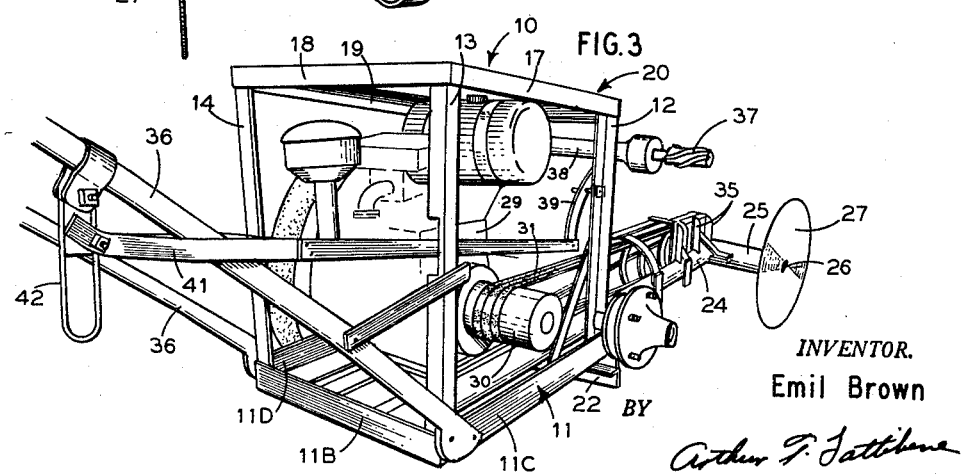
INVENTOR.
Emil Brown
ATTORNEY

United States Patent Office 3,080,896
Patented Mar. 12, 1963

3,080,896
PUSHCART-TYPE TREE AND BRUSH CUTTING MACHINE
Emil Brown, Rte. 1, Box 475, New Braunfels, Tex.
Filed Sept. 15, 1960, Ser. No. 56,144
2 Claims. (Cl. 143—43)

This invention relates generally to a tree and brush cutting machine, but more specifically to an improved power operated, self propelled tree and brush cutting machine.

Experience has proved that the known tree and brush cutting machines are difficult to operate and control. This difficulty has been attributed to their relatively large bulk and size, engine vibration and instability due to their top heavy type of construction. The operation of these known constructions proved to be particularly hazardous on rough or hilly terrain because of their tendency to overturn. It frequently happens that the cutter of such machines will snag or otherwise get caught, causing the cutter beam to be violently swung against a tree. When this occurs serious damage may result to the machine.

Also in the known self propelled type of machines, relatively costly and complicated drive mechanisms are utilized, all of which tend to increase the cost, weight and operating maintenance.

Therefore it is an object of this invention to provide a tree and brush cutting machine with an improved beam construction for absorbing shocks resulting from any snagging of the cutting tool.

Another object of this invention is to provide a power operated, self propelling tree and brush cutting machine with a free wheeling chassis.

Another object is to provide a tree and brush cutting machine that is relatively light in weight, sturdy in construction, stable in operation, safe to operate, and easy to roll over obstacles and rough terrain.

The foregoing objects, and other features and advantages are attained by a tree and brush cutting machine having a sturdily constructed frame or chassis supported by a pair of free wheeling wheels journaled to an axle which is provided with an intermediate offset portion or drop therein for lowering the center of gravity of the machine to improve its stability when riding over obstacles or rough terrain. Extending forwardly of the frame is a straight beam for supporting a spindle and connected cutting tool. Preferably the beam is constructed in two sections to facilitate the positioning of the cutting tool in either a vertical or horizontal cutting position. Several laterally extending fins are connected to the beam adjacent the cutting head to absorb any shock incurred by a violent swinging of the beam due to unavoidable snagging of the cutting tool. A flexible belt means is provided to connect the cutting tool in driving relationship with a suitable motor means.

In accordance with this invention the machine is rendered self propelling by means of driving rollers which are pivotally mounted to the frame and are arranged to engage and disengage the main wheels at the will of the operator. The rollers are connected in driving relationship with the same motor driving the cutting tool.

A feature of this invention resides in the provision of fin means connected to the beam adjacent the cutting head to absorb any shocks or violent swinging of the beams due to tool snagging.

Another feature resides in the provision of a chassis or frame supported by a pair of free wheeling wheels journaled to an axle having an offset drop therein.

Another feature resides in the utilization of a straight beam for supporting the cutting tool forwardly of the frame.

Another feature resides in the use of self propeller rollers provided with a helical bead for a smoother driving action.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIGS. 1 to 3 are perspective views of the tree and brush cutting machine observed from various angles to illustrate its novel features. FIG. 1 illustrates the cutting blade in a horizontal cutting plane; and in FIGS. 2 and 3 the cutting blade is disposed in a vertical cutting plane.

FIG. 4 is a side view illustrating the self propelled drive mechanism.

FIG. 5 is a detail view of the means enabling the cutting blade to be rotated to either cutting position.

FIG. 6 is a detail of the offset axle assembly.

Referring to the drawings, the tree and brush cutting machine 10 comprises a chassis 11 which consists of rectangularly disposed structural members 11A, 11B, 11C, 11D such as angle bars. Four upright post members 12, 13, 14, 15 positioned at the corners of the chassis and connected at their upper ends with angle members 16, 17, 18 and 19 define the frame portion 20 of the machine.

According to this invention the chassis 11 and connected frame 20 are supported by a pair of large diameter wheels 21 which are journaled to an axle 22. As shown in FIG. 6, the axle is provided with a drop or offset portion 23. A feature of this invention resides in positioning the chassis in the offset portion of the axle, and as shown in FIG. 3, the axle 22 is disposed adjacent the front posts 12 and 15 of the frame 20. With this construction, the center of gravity of the machine is lowered, thereby enhancing its stability, permitting it to roll over rough and hilly terrain without danger of tipping over.

Extending forwardly of the chassis 11 and connected thereto is the cutter beam or tongue. Conneuted to the extended end of the beam 24 is a cutting head 25 rotatably supporting the cutter spindle 26. A circular cutting tool or blade 27 is connected to the lower end of the spindle 25 and a pulley 28 is fixed to the upper end of the spindle 25.

Means for rotating the blade 27 includes a gas engine 29 having a drive pulley 30, and a flexible belt 31 connecting the spindle pulley 28 and connected spindle 26 in driving relationship with the engine drive pulley 30.

In accordance with this invention the beam or tongue 24 is disposed to one side of the chassis and it is constructed so as to be readily rotated for positioning the cutting tool 27 in either a horizontal cutting plane as shown in FIG. 1 or in a vertical cutting plane as seen in FIGS. 2 and 3. Referring to FIG. 5, the beam is shown as being formed of separate sections 24A and 24B, section 24A extending slightly beyond the front end of the chassis 11. Connected to the forward end of beam section 24A is a sleeve 32 into which one end of section 24B is received. The sleeve is provided with a radially extending hole 32A which is adapted to align with either opening 24C, 24D in beam 24B and which openings are spaced at right angles. Thus, by proper alignment of hole 32A with either of the holes 24C or 24D in section 24B, and inserting a locking pin 33 will determine the position of the cutting blade. As shown, the beam is made straight. This construction minimizes the stress imposed on the beam over that of a bent or curved beam and vibration on the machine during a cutting operation.

To protect the belt 31 from entanglement with brush and falling branches during a cutting operation, there is provided a guard 34. Oftentimes it happens that the cutting tool 26 unavoidably becomes snagged or caught during a cutting operation. When this occurs the beam 24 is violently swung into the tree being cut. This unavoidable snagging can oftentimes result in damage to the cutting head and tool. To absorb these shocks there is provided in accordance with this invention a plurality of laterally extending fins 35 integrally attached to the beam adjacent the cutting head. As illustrated in FIG. 1, the fins extend laterally on one side of the beam 24 since the saw blade 27 turns only in one direction. Thus when the blade 27 snags and is suddenly stopped, the reaction is such that the beam is violently pulled into the stump or brush snagging the blade. Unless the shock of this impact can be minimized, severe damage can occur. Accordingly, the fins 35, extending laterally of the beam 24 and in the direction of impact, can successively buffer or minimize this shock or impact before it reaches a climax. Generally these fins 35 extend outwardly from the beam approximately 7 inches or the equivalent of a substantial portion of the radius of the blade, and they extend back from the head approximately 18 inches or one-half the diameter of the blade. These fins also protect the guard 35.

It must be remembered that the cutter blade is operating at a very high r.p.m. Thus when it is suddenly stopped, i.e. snagged, the operating forces are such that the tongue to which the cutting head is attached is suddenly pulled into the obstacle binding the cutting. Unless means were provided to absorb this impact, the cutting head would be violently slammed into the object, and more than likely would suffer some damage. Repeated impacts of this nature would render the entire cutter head useless. Therefore with applicant's fin construction projecting lateral of the tongue, a suitable inexpensive buffering device is provided which saves the cutting head from unnecessary bumps and impacts.

The lateral fins are not intended to add stiffness to the beam. The fins serve to save the head from impacting against the snagged obstacle.

A pair of extended handles 36 is connected to the end of the frame for operating the machine. The handles are sufficiently long so as to supply the necessary leverage to facilitate handling of the machine during the cutting operation.

In accordance with this invention, the machine 10 is rendered self propelling by a novel drive means. As seen in FIGS. 2 and 3 the drive means includes a pair of drive rollers 37 which are journaled to a crossbar 38. The crossbar 38 is pivoted to the front post 12, 15 of the frame by levers 39, 40. A connecting link 41 is pivoted at one end to lever 39 and at the other end to an operator 42 which is located on one of the handles 36. Means for rotating the rollers includes a belt drive 43 which connects a roller pulley 44 in driving relationship with the other end of the engine drive shaft 30. If desired a tension pulley 45 is provided to maintain the belt 43 from slipping.

It is to be observed that each of the rollers 37 is provided with a helical bead for insuring a smooth uninterrupted drive when the rollers 37 are brought into contact with the wheels 21. Thus whenever it is desired that the machine be rendered self propelled, the operator need only actuate the operator 42. The rollers, through the linkage described, are then brought into engagement with each of the main wheels 21 to drive them.

In accordance with this invention the wheels are journaled to the axle for free wheeling. The free wheeling thus enables the machine to be pulled backwards or turned in either direction with equal facility. When the rollers engage with the wheels, they spin the wheels to drive the machine forward.

From the foregoing description it will be noted that the machine is sturdily constructed of self bracing angles. The large wheels (30") facilitate its movement over rough terrain, and the dropped axle minimizes engine vibration. Also it renders it possible to cut brush on steep hills without danger of tipping over. The dropped axle permits the use of a short head which makes it easier to cut the underside of low lying trees and the blade 26 is better able to reach under low lying branches.

The machine is relatively light in weight, approximately 235 lbs. The incorporation of a relatively small 8 H.P. engine is a factor in the lightness of overall weight. While small, the machine is rugged and capable of heavy duty performance.

While in accordance with the provisions of the statutes there is illustrated and described herein the best form and mode of operation of the invention now known to the inventor, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A tree and brush cutting machine comprising a chassis, wheel means supporting said chassis, a power means having a drive shaft mounted on said chassis, a beam connected to said chassis and extending forwardly therefrom, a head including a rotary cutting tool means connected to the forward end of said beam, flexible drive means connecting said cutting tool means in driving relationship with said drive shaft, a fin extending laterally of said beam a substantial distance adjacent said cutting tool means forming a buffer for absorbing and minimizing shocks due to snagging of said cutter and thereby prohibiting destruction or damage to said head, means for rendering said machine either self propelling or free wheeling, and a handle means connected to the rear of said chassis.

2. A tree and brush cutting machine comprising a chassis, wheel means supporting said chassis, said wheel means including a dropped axle connected to said chassis, and a pair of free-wheeling wheels mounted on said axle, a gasoline engine having a drive shaft mounted on said chassis, a straight beam connected to said chassis and extending forwardly therefrom, a head connected to the forward end of said beam at substantially right-angles thereto, a spindle rotatably mounted in said head, a circular cutter connected to said spindle, flexible drive means connecting said spindle in driving relationship with said drive shaft, means for rotating said beam for selectively operating said cutter either in a horizontal plane or a vertical plane, a guard connected to said beam for protecting said flexible drive means in either of said cutter positions, a plurality of fins fixed to and extending laterally of and longitudinally spaced along said beam adjacent said spindle, said fins extending laterally of said beam a substantial distance for absorbing shocks due to snagging of said cutter, said fins serving to minimize shocks due to snagging by defining a buffer between the head connected to the beam and the obstacle snagging said cutter so that on swinging of the cutter into the obstacle on snagging said fins serve to absorb the shock of impact rather than said head, and means for rendering said machine self propelling, said means including a pair of rollers driven by said engine pivotally mounted to said frame for engaging and disengaging said wheels, said rollers each being provided with spiral beads, and an operating lever connected to said rollers for selectively engaging or disengaging said rollers in driving relationship with said wheels, and a long handle connected to the rear of said chassis.

References Cited in the file of this patent

UNITED STATES PATENTS

| | | |
|---|---|---|
| 1,858,015 | Hodgson | May 10, 1932 |
| 2,435,192 | Arsneau | Feb. 3, 1948 |
| 2,461,188 | Stoner | Feb. 8, 1949 |
| 2,597,017 | McKinstry | May 20, 1952 |
| 2,635,649 | Brownlee | Apr. 21, 1953 |
| 2,815,049 | Herscovitch | Dec. 3, 1957 |

FOREIGN PATENTS

| | | |
|---|---|---|
| 104,509 | Australia | July 7, 1938 |
| 117,455 | Australia | Aug. 31, 1943 |